United States Patent
Lee et al.

(10) Patent No.: US 8,615,071 B2
(45) Date of Patent: Dec. 24, 2013

(54) MESSAGE IDENTIFICATION, CORRELATION, RECIPIENT AUTHENTICATION, AND RECEPTION CONFIRMATION IN MULTI-EVENT AND MULTI-MEDIA ENVIRONMENTS

(75) Inventors: Chiao-Wei Lee, Edison, NJ (US);
Chao-Chi Tong, Somerset, NJ (US);
Mark J. Szachara, Kendall Park, NJ (US)

(73) Assignee: TTI Inventions C LLC, Wilmington, DE (US)

( * ) Notice: Subject to any disclaimer, the term of this patent is extended or adjusted under 35 U.S.C. 154(b) by 2160 days.

(21) Appl. No.: 11/262,626

(22) Filed: Oct. 31, 2005

(65) Prior Publication Data
US 2007/0118647 A1    May 24, 2007

(51) Int. Cl.
*H04M 11/00* (2006.01)

(52) U.S. Cl.
USPC .................................. 379/88.13; 379/142.01

(58) Field of Classification Search
USPC ........................................... 379/88.13, 88.22
See application file for complete search history.

(56) References Cited

U.S. PATENT DOCUMENTS

| | | | | |
|---|---|---|---|---|
| 5,218,631 | A  * | 6/1993 | Katz | 463/41 |
| 5,559,867 | A  * | 9/1996 | Langsenkamp et al. | 379/69 |
| 7,369,530 | B2 * | 5/2008 | Keagy | 370/340 |
| 7,933,385 | B2 * | 4/2011 | Dickinson et al. | 379/45 |
| 2004/0150518 | A1 * | 8/2004 | Phillips et al. | 340/500 |
| 2005/0282518 | A1 * | 12/2005 | D'Evelyn et al. | 455/404.1 |
| 2006/0068753 | A1 * | 3/2006 | Karpen et al. | 455/404.2 |
| 2007/0060097 | A1 * | 3/2007 | Edge et al. | 455/404.1 |

* cited by examiner

*Primary Examiner* — Joseph T Phan
(74) *Attorney, Agent, or Firm* — Fitch, Even, Tabin & Flannery LLP

(57) ABSTRACT

A generic approach for identifying, authenticating, and correlating a received massage with a particular event and a particular recipient, regardless of the number of events, number of recipients and types of media used for the originally sent message, is achieved by the inclusion of a unique ID embedded in each originally sent message. Upon receipt of an incoming reply message, a parser extracts the unique ID information provided by the recipient from the message for correlation of the incoming message with the associated sent message.

29 Claims, 3 Drawing Sheets

MESSAGE IDENTIFICATION, CORRELATION, RECIPIENT AUTHENTICATION, AND RECEPTION CONFIRMATION IN MULTI-EVENT AND MULTI-MEDIA ENVIRONMENTS

FIELD OF THE INVENTION

The present invention relates to wireless communication and particularly to message identification, correlation, recipient authentication and reception confirmation for multiple events and multiple media environments with different message recipients.

BACKGROUND OF THE INVENTION

Existing message notification systems do not solve the message correlation problem. Current systems are unable to perform a correlation between message reception and message delivery in multi-media channels and multi-event environments. As used herein, media and media channel refers to, but is not limited to, landline phone service, cellular phone service, short message service (SMS), email, blackberry service, text pager service, and the like.

Prior solutions either do not offer the correlation capability among multiple responses with multiple events or they are based upon service provider proprietary technology valid only within limited domains. There is no generic solution useful to identify and correlate messages with multiple responses from different recipients. Particularly, there are no solutions that are independent of service providers.

The prior solutions are valid within the private domains. There is no prior solution capable of providing a generic approach. For example, a service offered by one carrier may be able to identify and correlate a message with which event the message should belong when there is only one event happening at a time. When there are multiple received messages for different events from a user, the system may have problems identifying and correlating these multiple messages. When service is only for one-way communication this is not a serious problem from a carrier's perspective. When a reply is not necessary, there is no demand for such an identification and correlation of messages. However, a generic approach is important for a service provider that offers service through a carrier's infrastructure. It is not practical to rely on a carrier for providing the information a service provider needs, especially when messages will be sent through multiple carriers and through other service providers.

When a message notification system sends a notification message through different media channels to notify a recipient of an emergency event, the system should be capable of distinguishing the reply messages from recipients sent via the different media channels. The system should identify which received message is correlated with the message delivered by the system. This message correlation feature correlates the message delivered by the system with a reply message. The message correlation feature allows the notification system to keep track of the progress of the message delivery and ensures message confirmation. Existing systems are not able to provide message reception and message delivery correlation with respect to an event, especially, in the presence of multiple-event occurrences in heterogeneous media-channel environments. In addition, the present invention is independent of particular service providers, in contrast to current systems which are heavily dependent on service providers.

The present invention provides unique advantages over the existing solutions by being capable of identifying, authenticating, and correlating multiple messages with different recipients for multiple events with multiple media.

SUMMARY OF THE INVENTION

The present invention provides a generic approach to authenticating the recipient's identity, confirming reception, identifying, and correlating a received message with the event and the recipient with which the received message is associated, regardless of the number of events, messages and types of media used by the originally sent message.

In order to develop a generic algorithm capable of correlating message delivery and message reception for multiple events with different message recipients, the algorithm has to be capable of distinguishing messages delivered with respect to a specific event, via different types of media channels, to the same recipient and correlating message reception from different media channels, and distinguishing different event-triggered messages. The message identification and message correlation is of significance, particularly in intelligent notification systems.

The generic identification and correlation approach for received messages through different media from multiple events is accomplished by utilizing the combination of a group of required information, including MessageID, EventID, RecipientID, and media address.

The present invention provides the following features not currently found in existing systems: the system is able to send a large quantity of messages to multiple different recipients. Each recipient may have more than one media channel for receiving messages, such as public switched telephone network (PSTN) phone call, email, short message service (SMS), pager and blackberry devices, and the like, from different service providers. The system is capable also of identifying bounced or returned or unreachable messages due to delivery failure or wrong media address. When the recipients reply to the messages, even replying to more than one message from different devices for the same event, the system is able to distinguish the multiple messages receiving acknowledgements from the same recipient and to record the message status. A detailed status report can be generated if necessary.

The present invention will be more clearly understood when the following description is read in conjunction with the accompanying drawings.

DETAILED DESCRIPTION

Figure 1:
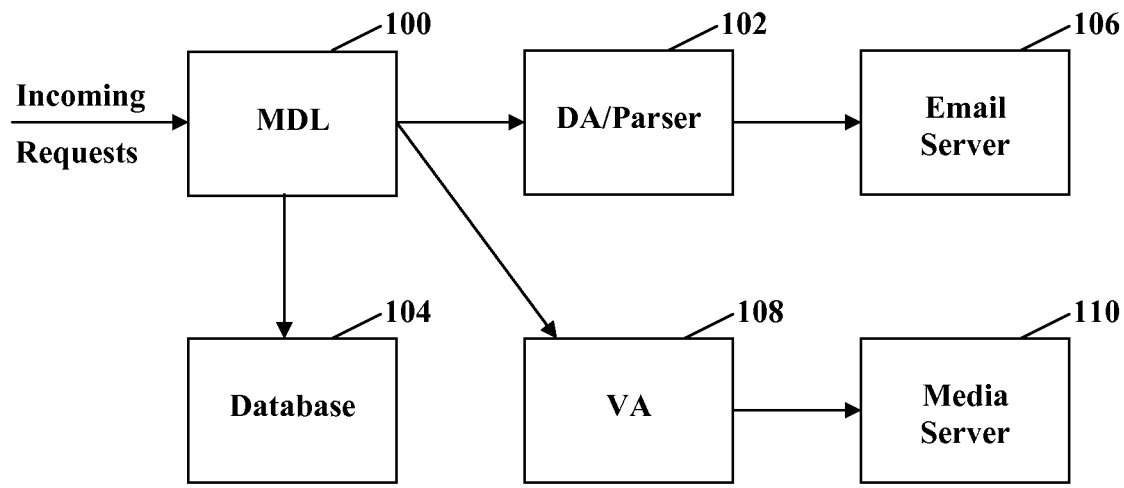
FIG. 1 is a schematic block diagram of the outgoing process flow of messages.
Figure 2:
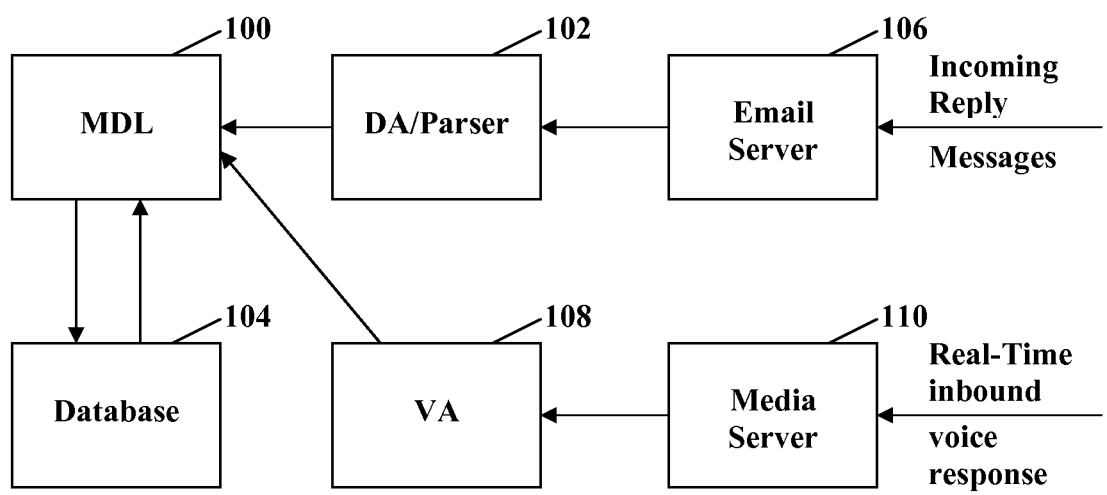
FIG. 2 is a schematic block diagram of flow processing, identifying and correlating of reply messages.

In order to better understand the present invention it will be instructive to describe the functionality of each component of the system with reference to FIG. 1 and FIG. 2:

Message Distribution Logic (MDL) 100:

MDL 100 is the component responsible for generating unique MessageID, preparing required information for Voice Agent (VA) 108 and Data Agent (DA) 102 to deliver messages, storing information in corresponding database tables 104, correlating messages across multiple events and multiple media, and performing identity authentication.

Data Agent/Parser (DA) 102:

DA 102 is responsible for constructing the messages to be sent to recipients through different media, parsing the reply messages fetched from the email server 106, identifying the MessageID, PIN in the message body, and recipient's media address. The DA 102 then sends the information in a status update report to the MDL 100 for further correlation and processing.

Voice Agent (VA) 108:

VA 108 is responsible for managing voice message delivery through media server 110 to PSTN phone number and correlating call status with MessageID when call status is returned from the media server 110. The VA 108 then sends the information in a status update report to the MDL 100 for further correlation and processing.

The functionality of supporting components which are acquired from existing resources are as follows:

Email Server 106:

A generic Email Server 106 is used to deliver and receive text messages requested by Data Agent 102. All messages, either sent through different media or service, such as SMS or email, are wrapped in standard Internet email format and delivered by this email server.

The functionality of the Email server 106 and its configuration in order to get the reply messages for further correlation, is important; however, this configuration does not require customized email server implementation.

1. Set up a user account for TNS use. The user name of this account will be used to map different aliases to this particular user account. In TNS, this user account is "tns".
2. For the system implementation, preferably a sendmail email server is chosen as the component responsible for delivering email. In the configuration responsible for "aliases" of the email server, it is necessary to add pattern matching rules, or so-called "local aliases" in the sendmail server, so messages with the particular local alias will be forwarded to a particular user account. For instance:
   tns:tns
   fsisac:tns
   demo:tns
   Based on the rules above, messages with "to" address starts with "tns", "fsisac" and "demo" will be forwarded to "tns" user account.

Media Server 110:

Media server 110 is used as the entity controlling the voice call connections with the contracted telephone network carrier. Media Server 110 is supervised by the VA 108 to establish or terminate voice call connections, converts PSTN signals to common status messages then sends the messages back to VA 108.

Database 104:

The Database 104 is a storage device used to store the information associated with each event message in an individual folder along with the status of sent messages.

The configuration guideline of the different components with mandatory database fields and their functionality in order to achieve the unique capability of the present invention, requires the following database fields:

1. EventID: this field may have data type in integer or string. This is used to represent a particular event that occurred which requires the sending of notifications.
2. RecipientID: this is used to represent a particular user registered in the notification system. This ID may be also used for other purposes, such as user ID.
3. MessageID: This is a system-wide unique ID used to represent a particular message sent.
4. Media address: This represents the address of a type of media, such as email address.

These mandatory fields may reside in different tables but it is the responsibility of the implementation to gather information from all these required fields.

In order to generate a system-wide unique MessageID, the MDL 100 uses a function generating unique sequence number from an Oracle database, for example, which is the database chosen in TNS, to generate a system-wide unique integer as the MessageID.

Figure 3:
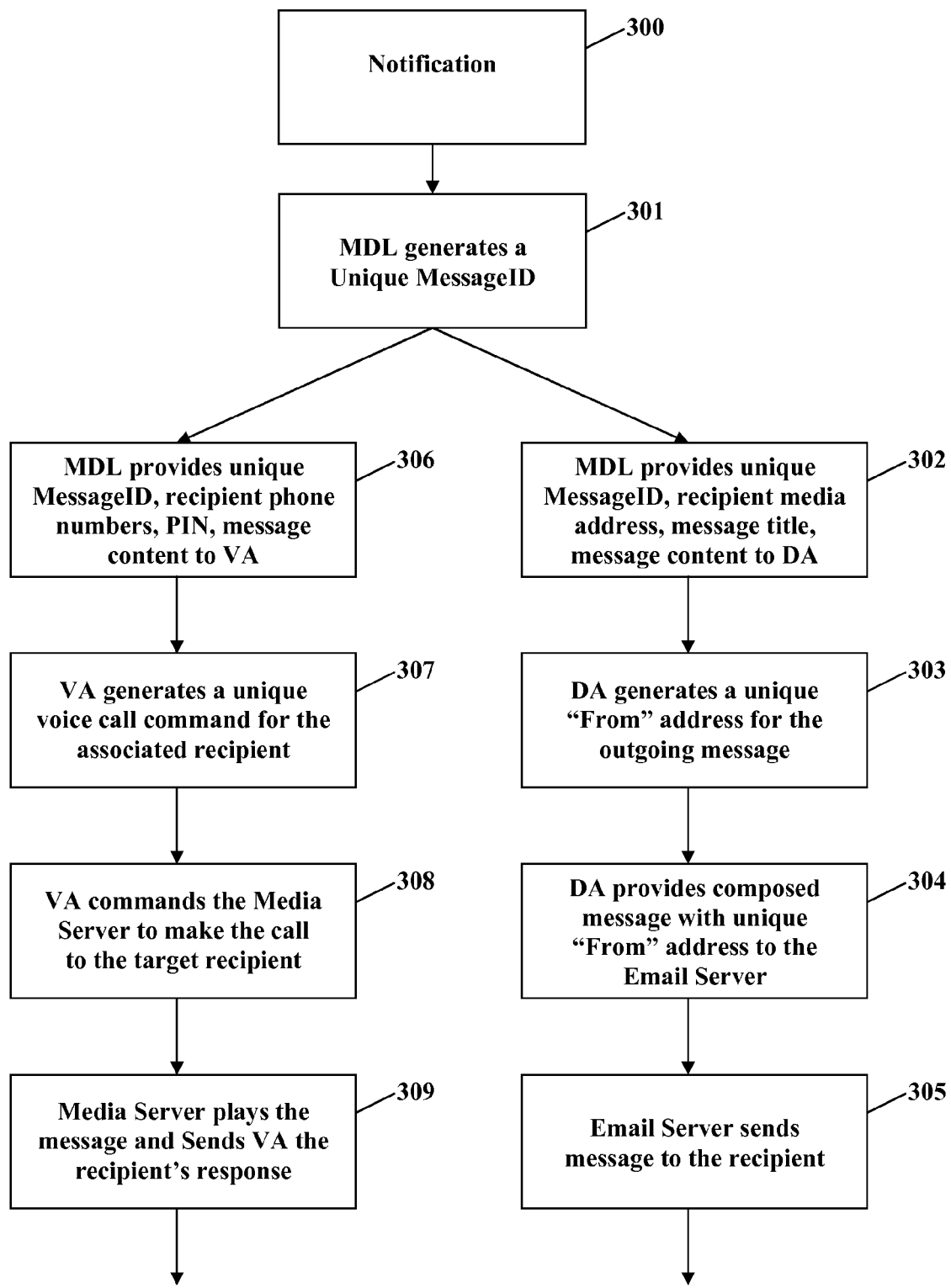
FIG. 3 is a flow chart of a method of the process for preparing a message for transmission, including a unique ID.

Having described the functionality of the components comprising the system, the operation of the system shown in FIG. 1 and FIG. 2 will now be described in conjunction with the flow charts in FIG. 3 and FIG. 4. FIG. 1 shows a schematic block diagram of the outgoing process flow of a message where Message Distribution Logic (MDL) 100 generates a unique MessageID for each message 301. Referring now to FIG. 3, at 300 the MDL 100 receives a request to send notifications to a chosen group of recipients. At 301, the MDL prepares the required information, generates the unique MessageID for each message, generates the EventID to represent such an event request, packages the information together then sends the packaged information to both or either Voice Agent 108, at 306 and Data Agent 102, at 302, depending on the event request. For text-based messages, the MDL 100 sends the unique MessageID, along with other required information, including recipient's media address to a Data Agent/Parser (DA) 102, in step 302. The term media address refers to the particular media related address used to send a message to a recipient based on the media used to communicate with the recipient, such as email address. For voice message, the MDL 100 sends the unique MessageID, the associated phone number, the associated personal identification number (PIN), along wither other information to a Voice Agent (108). The MDL 100 also sends the information to a Database 104 where the information is stored. For instance, in the Database 104, each message has its own record kept. The MessageID, RecipientID, EventID, and media address are the required information stored and the combination of these parameters will be used for further processing. The MDL 100 also tracks the message periodically.

The system is able to send a large volume of messages to multiple, different recipients having different message devices. Each recipient may have more than one media to receive messages, such as landline phone number, cellular phone number, email, SMS, a blackberry device, or the like from different service providers. The result is a platform and technology-independent, carrier-agnostic, and media-neutral capability.

Process in Voice Agent 108 after receiving the notification delivery request from the MDL 100:

1. At 307, once Voice Agent 108 receives the notification delivery request with required information from MDL 100, Voice Agent 108 retrieves the mandatory information, such as phone number, and initiates the voice call command to Media Server 110. At 308, Media Server 110 is the component responsible for making call connections to telephone carriers to dial out to the target phone numbers.
2. At 309, once a voice call is established end-to-end, Voice Agent 108 will be able to play the message while the phone is picked up. The voice message and process work as interactive voice response (IVR). Depending on the application requirement, different process can be defined to accommodate the demands. FIG. 4 is a flow chart of the processing of incoming reply messages. During the call duration, at 409, Voice Agent 108 is able to get the status information through dial tone multi-frequency (DTMF) codes responded by the recipients. If the IVR response requires the recipient to enter a PIN for identification authentication and reception confirmation, at 410 the Voice Agent 108 gets the PIN from DTMF codes while the recipient enters a PIN through the phone keypad. Other types of response may be collected as well, depending on the IVR flows. At 411, Voice Agent 108 plays the voice message and collects the input PIN and recipient's response by interpreting the DTMF codes.

3. Since the Voice Agent 108 receives a PIN from the MDL 100, Voice Agent 108 can perform authentication locally. Depending on the application requirement, the Voice Agent 108 may require the recipient to input the PIN, get authenticated then play the voice message. If the authentication fails, the message is not played.

4. After the call is finished, at 412 the Voice Agent gathers the collected response and results of authentication and reception confirmation, puts the information into a status update report message then, at 413, sends this message back to the MDL 100.

Process in Data Agent 102 after receiving the notification delivery request from the MDL 100. Referring to FIG. 3 and FIG. 4:

1. At 302, Data Agent 102 receives the notification delivery request with required information from MDL 100. DA 102 extracts the information, such as the recipient's media address, MessageID, EventID, message subject, content, etc. At 303, Data Agent 102 composes the message, embeds the MessageID in the "from address," and makes the "from address" in the following format:
   tns+xxxxx @tns.telcordia.com
   Where "xxxxx" is the MessageID from MDL 100 and "tns.telcordia.com" is the TNS domain name (in this example telcordia.com). The plus sign, "+", is only a string separator acceptable for a Sendmail email server.
2. Depending on the requirements, there are two preferred methods of assigning the "from address" for the composed messages. The first method is to assign the string formed in the previous section as the "From address" in the composed message. The second method is to assign a customized "tag" as the "From address" and add one more parameter, "Reply To", in the message header. The string formed in the previous section will be assigned to "Reply To". The customized tag can be composed based on different demands in the following format:
   Tag_Name<customized media address>
   For instance, a tag created for Verizon may look like the following:
   Verizon<admin @verizon.com>
   Where "Verizon" is the Tag_Name and admin@verizon.com is the customized media address for Verizon.

Therefore, the "From address" in the composed message will look in either of the following formats:
   From: tns+xxxxx@tns.telcordia.com
   or
   From: Verizonadmin@verizon.com
   Reply To: tns+xxxxx@tns.telcordia.com At 304, Data Agent 102 sends the composed messages to the Email Server 106 for delivery to the recipient or recipients at 305.

Figure 4:
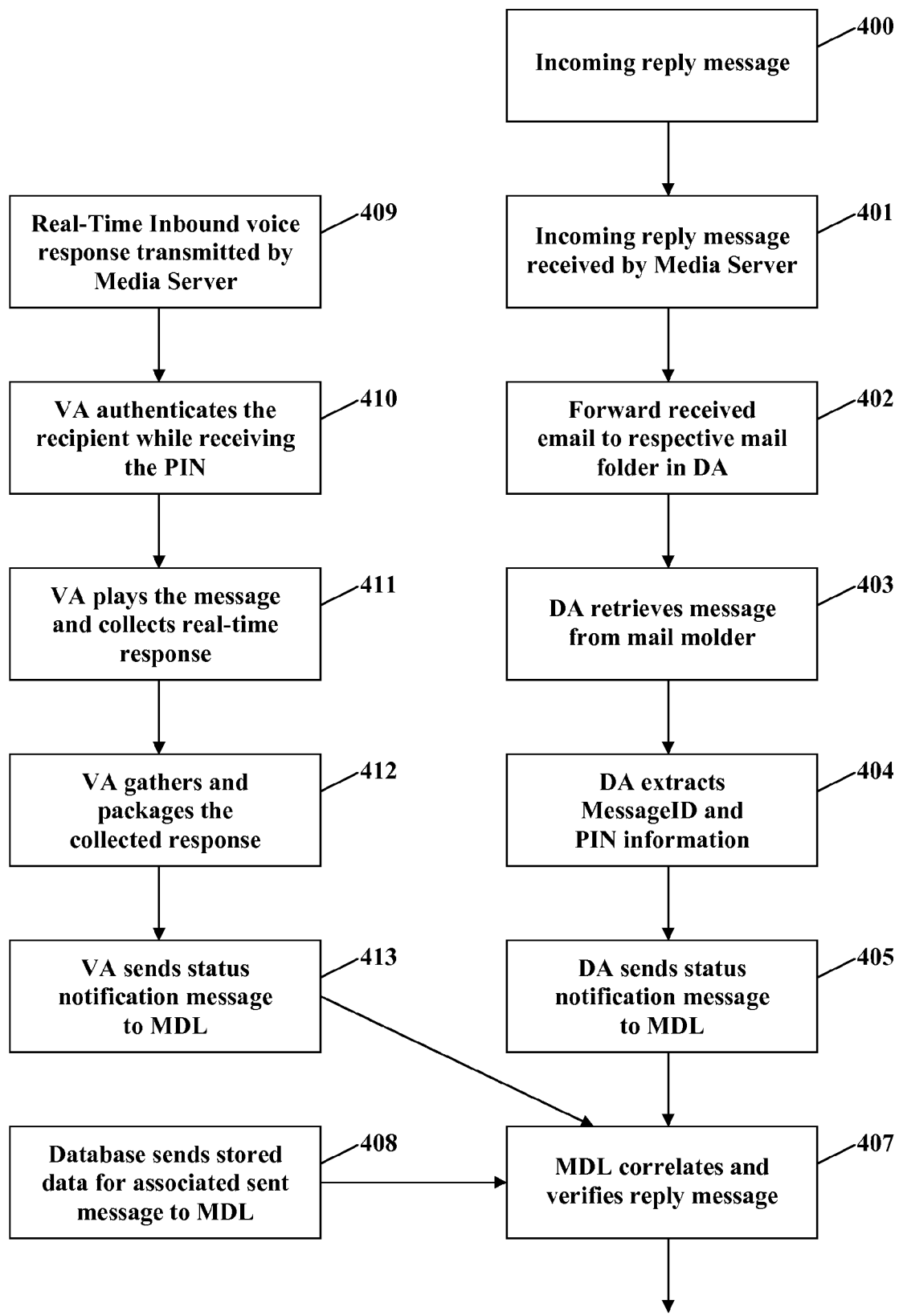
FIG. 4 is a flow chart of a method of the processing of incoming reply messages.

Referring to FIG. 4, when an authorized subscriber replies to a message, the incoming reply message 400 address is as this format: tns+xxxxx@tns.telcordia.com, regardless how the "From address" is formed in the sent message.

With the email server configuration as described above, at 401 when an incoming reply message arrives at the email server 106, messages are forwarded to the corresponding user account or mail folder based on the aliases configuration at 402. At 403, Data Agent/Parser 102 then periodically opens the mail folder of this user account and retrieves the messages if there are any. At 404, DA 102 parses the messages, and extracts the information, particularly looking for the embedded MessageID, the PIN contained in the message body and the recipient's media address. DA 102 also parses and identifies the same information for bounced messages. At 405, DA 102 then collects the identified information and status, including identifying bounced messages, and sends the status update back to MDL 100. Such a status update report typically contains the following information:
   A. MessageID, recipient's media address and PIN of a valid message
   B. MessageID and recipient's media address of a bounced message At 407, MDL 100 receives status update report from either VA 108 or DA 102, and correlates and verifies the reply message.

Status update reports from VA 108 contain the information of whether the call goes through, the MessageID, and the corresponding phone number. MDL 100 stores the information and updates the status in the corresponding Database 104 fields. Based on this combination of information, MDL 100 will be able to correlate the voice message with the other messages sent through different media channels with the corresponding event and the associated recipient. MDL 100 then can realize the notification delivery status of this particular event to the associated recipient: whether the recipient is notified by any media, is the message delivery confirmed, is it delivered to the correct recipient with the correct PIN, or the status of delivery errors.

Status update reports from DA 102 contain the information of whether the message sent is bounced, the MessageID, the recipient's media address and the identified PIN. MDL 100 stores the information and updates the status in the corresponding Database 104 fields. At 408, MDL 100 then verifies whether the identified PIN matches the record stored in the Database 104 to realize the identification of the associated recipient. Based on this combination of information, MDL 100 will be able to correlate the message with the other messages sent through different media channels with the corresponding event and the associated recipient. After this, MDL 100 can realize the notification delivery status of this particular event to the associated recipient: whether the recipient is notified by any means of media, is the message delivery confirmed, is it delivered to the correct recipient with the correct PIN, or the status of delivery errors.

Approach to Reply with PIN and Identify the PIN

The process for identifying the PIN from an email response requires a certain format and instruction. A random reply format will create unnecessary burdens for the data parser 102. Subscribers are assumed to reply to the message with the PIN in the following steps:
   Reply and make certain the "Reply To" address appears;
   At the top, first line of the content in the reply message, insert the PIN (assume that the PIN is a 4-digit number) followed by a space or "enter". For example, xxxx(Space or Enter).

In another example where the media is short message service (SMS), for each notification, the MDL 100 generates a unique ID (temporarily called MessageID) associated with a particular destination address and sends this information to the Data Agent/Parser 102. The Data Agent/Parser 102 receives this information and generates a unique "From" address for the outgoing message in the format described above in conjunction with the email message.

For an SMS reply, only the "From" field remains. Embedding the MessageID into the field of the sent message guarantees the successful identification of the MessageID. When the subscriber replies to the message, the address will become the "To" address. A Data Parser in the DA 102 retrieves the messages from the mail folder and processes the messages to extract the MessageID and PIN information as described above. The PIN information is a unique secret identifier associated with each respective authorized recipient (similar to a PIN number associated with an ATM card) which is used by an authorized recipient to indicate receipt of a message and to indicate the identity of the responder. After the Data Parser in the DA 102 extracts the MessageID and PIN information, the Data Parser sends a status notification message to the MDL 100 confirming the identity of the authorized recipient responding to the original message.

The method and system for identification, authentication, and correlation is possible for multiple media channels including email, voice, and SMS services.

While there has been described and illustrated a system and method for identifying and correlating multiple messages to different recipients for multiple events, it will be apparent to those skilled in the art that variations and modifications are possible without deviating from the broad teachings and scope of the present invention which shall be limited solely by the scope of the claims appended hereto.

What is claimed is:

1. A method for identification and correlation of an incoming reply message in a multi-event and multi-media environment, the method comprising:
generating from a message distribution logic element a unique identifier (ID) for an outgoing data message to be sent to a recipient;
embedding at a data agent element configured for communication with the message distribution logic element the unique ID in the data outgoing message to be sent to the recipient;
sending the outgoing data message from a server configured for communication with the data agent element with the embedded unique ID to the recipient;
receiving a reply message at the server from the recipient responsive to receiving the outgoing data message;
extracting the unique ID from the reply message at the data agent element; and
correlating the reply message with the outgoing data message at the message distribution logic element.

2. A method as set forth in claim 1, wherein generating the unique ID comprises embedding the unique ID in the "From" address of a text message to be sent.

3. A method as set forth in claim 1, wherein generating the unique ID comprises embedding the unique ID in the "Reply to" field of the reply message.

4. A method as set forth in claim 1, wherein generating the unique ID comprises generating the unique ID to be different for individual sent messages based on an event, media, or recipient.

5. A method as set forth in claim 1, further comprising receiving a PIN identifier in the reply message.

6. A method as set forth in claim 5, further comprising extracting the PIN identifier from the reply message to identify and authenticate the recipient.

7. An apparatus for identification and correlation of an incoming reply message in a multi-event and multi-media environment, the apparatus comprising:
means for generating a unique ID for at least one data message to be sent to a recipient;
means for embedding the unique ID in the at least one data message to be sent to the recipient;
means for storing data associated with the at least one data message including the unique ID;
means for sending the at least one data message having the unique ID embedded therein to the recipient;
means for receiving a reply message having the unique ID from the recipient responsive to receiving the at least one data message;
means for extracting the unique ID from the reply message; and
means for correlating the reply message with the at least one data message.

8. An apparatus as set forth in claim 7, wherein the means for embedding the unique ID is configured to embed the unique ID in the "From" address of the at least one data message.

9. An apparatus as set forth in claim 8, wherein the means for extracting the unique ID is configured to extract the unique ID from the "Reply to" field of the reply message.

10. An apparatus as set forth in claim 7, wherein the means for generating the unique ID is configured to generate a unique ID that is different for individual sent messages based on an event, media, or recipient.

11. An apparatus as set forth in claim 7, where the stored data comprises a PIN identifier, recipient media address, message content, and a time stamp.

12. An apparatus as set forth in claim 7, where the means for extracting the unique ID is configured to extract a PIN identifier in the reply message.

13. An apparatus as set forth in claim 12, where the means for correlating is configured to compare the PIN identifier with PIN data associated with individual recipients stored in the means for storing to identify a sender of the reply message.

14. An apparatus as set forth in claim 7, where the means for sending is configured to send messages via multiple media.

15. An intelligent notification apparatus configured to generate a plurality of outgoing multi-media messages and send the plurality of outgoing multi-media messages to a plurality of recipients, wherein the plurality of outgoing multi-media messages are related to a plurality of events, and wherein individual ones of the plurality of outgoing multi-media messages comprise:
an embedded unique ID generated by the intelligent notification apparatus, the unique ID comprising data configured to trigger the intelligent notification apparatus, in response to receiving a reply message to a corresponding outgoing multi-media message, to automatically correlate the reply message with the corresponding multi-media message; and
a data field, containing a communication intended to solicit the reply message.

16. The intelligent notification apparatus of claim 15, wherein the unique ID is configured to distinguish the corresponding multi-media message from messages sent to different recipients.

17. The intelligent notification apparatus of claim 15, wherein the unique ID is configured to distinguish the corresponding multi-media message from messages sent using different media.

18. The intelligent notification apparatus of claim 15, wherein the unique ID is configured to distinguish the corresponding multi-media message from messages sent relating to different events.

19. The intelligent notification apparatus of claim 15, wherein the unique ID is embedded in a "From" field.

20. The intelligent notification apparatus of claim 15, wherein the unique ID in a "Reply-To".

21. The intelligent notification apparatus of claim 20, wherein the plurality of outgoing multi-media messages comprise at least one of short message service (SMS), e-mail, or text pager message.

22. The intelligent notification apparatus of claim 15, wherein the plurality of outgoing multi-media messages further comprise a PIN identifier configured to trigger the intelligent notification apparatus to automatically authenticate the reply message in response to receipt of the reply message.

23. A text based messaging device configured to transmit a multi-media reply message, the multi-media reply message comprising:
   a unique ID generated by an intelligent notification system and embedded within an outgoing multi-media message sent from the intelligent notification system, the unique ID comprising data configured to trigger the intelligent notification system, in response to receiving the multi-media reply message, to automatically correlate the multi-media reply message with the outgoing multi-media message; and
   a data field, containing a communication responsive to the outgoing multi-media message.

24. The text based messaging device of claim 23, wherein the unique ID is embedded within a recipient address alias.

25. A method for responding to a first multi-media data message, the method comprising:
   receiving at a messaging device a first multi-media data message having a unique ID generated by an intelligent notification system;
   generating a second multi-media data message responding to the first multi-media data message, the second multi-media data message having the unique ID embedded therein, such that the intelligent notification system, upon reception of the reply message, is configured to automatically correlate the second multi-media-data message with the first multi-media data message;
   transmitting the second multi-media data message from the messaging device to an address provided within the first multi-media data message.

26. The method of claim 25, wherein the embedding comprises programmatically inserting a "From" address of the first multi-media data message into the address of the second multi-media data message.

27. The method of claim 25, wherein the embedding comprises programmatically inserting a "Reply-To" address of the first multi-media data message into the address of the second multi-media data message.

28. The method of claim 25, further comprising embedding a PIN within the second multi-media data message.

29. An apparatus for identification and correlation of at least one incoming reply message or at least one incoming reply call, the apparatus comprising:
   an e-mail server configured to receive the at least one incoming reply message;
   a media server configured to receive the at least one incoming reply call;
   a data agent and parser configured to receive the at least one incoming reply message from the e-mail server and further configured generate a status update report related to the at least one incoming reply message;
   a voice agent configured to receive and process the at least one incoming reply call through the media server and further configured generate a status update report related to the at least one incoming reply call;
   a database configured to store data relating to at least one multi-media message previously sent by the e-mail server or the media server; and
   a message distribution logic engine configured to communicate with the data agent, voice agent, and database, wherein the message distribution logic engine is further configured to receive a status update report from the data agent or the voice agent and to correlate the at least one reply message or the at least one reply call with the at least one multi-media message previously sent, and wherein the message distribution logic engine is further configured to update data in the database relating to the at least one multi-media message previously sent.

* * * * *

UNITED STATES PATENT AND TRADEMARK OFFICE
CERTIFICATE OF CORRECTION

PATENT NO. : 8,615,071 B2  
APPLICATION NO. : 11/262626  
DATED : December 24, 2013  
INVENTOR(S) : Lee et al.

Page 1 of 2

It is certified that error appears in the above-identified patent and that said Letters Patent is hereby corrected as shown below:

On the Title Page, Item (56), under "OTHER PUBLICATIONS", in Column 2, Line 2, delete "massage" and insert -- message --, therefor.

In the Drawings

In Fig. 4, Sheet 3 of 3, for Tag "403", in Line 2, delete "molder" and insert -- folder --, therefor.

In the Claims

In Column 7, Line 45, in Claim 1, delete "the data outgoing message" and insert -- the outgoing data message --, therefor.

In Column 7, Line 56, in Claim 2, delete "A method" and insert -- The method --, therefor.

In Column 7, Line 57, in Claim 2, delete "the "From"" and insert -- a "From" --, therefor.

In Column 7, Line 59, in Claim 3, delete "A method" and insert -- The method --, therefor.

In Column 7, Lines 60-61, in Claim 3, delete "the "Reply to"" and insert -- a "Reply To" --, therefor.

In Column 7, Line 62, in Claim 4, delete "A method" and insert -- The method --, therefor.

In Column 7, Line 66, in Claim 5, delete "A method" and insert -- The method --, therefor.

In Column 8, Line 1, in Claim 6, delete "A method" and insert -- The method --, therefor.

In Column 8, Line 23, in Claim 8, delete "An apparatus" and insert -- The apparatus --, therefor.

Signed and Sealed this  
Ninth Day of September, 2014

Michelle K. Lee  
*Deputy Director of the United States Patent and Trademark Office*

CERTIFICATE OF CORRECTION (continued)
U.S. Pat. No. 8,615,071 B2

In Column 8, Line 25, in Claim 8, delete "the "From"" and insert -- a "From" --, therefor.

In Column 8, Line 27, in Claim 9, delete "An apparatus" and insert -- The apparatus --, therefor.

In Column 8, Line 29, in Claim 9, delete "the "Reply to"" and insert -- a "Reply To" --, therefor.

In Column 8, Line 30, in Claim 10, delete "An apparatus" and insert -- The apparatus --, therefor.

In Column 8, Line 34, in Claim 11, delete "An apparatus" and insert -- The apparatus --, therefor.

In Column 8, Line 34, in Claim 11, delete "where the" and insert -- wherein the --, therefor.

In Column 8, Line 37, in Claim 12, delete "An apparatus" and insert -- The apparatus --, therefor.

In Column 8, Line 37, in Claim 12, delete "where the" and insert -- wherein the --, therefor.

In Column 8, Line 40, in Claim 13, delete "An apparatus" and insert -- The apparatus --, therefor.

In Column 8, Line 40, in Claim 13, delete "where the" and insert -- wherein the --, therefor.

In Column 8, Line 45, in Claim 14, delete "An apparatus" and insert -- The apparatus --, therefor.

In Column 8, Line 45, in Claim 14, delete "where the" and insert -- wherein the --, therefor.

In Column 10, Line 26, in Claim 29, delete "configured generate" and insert -- configured to generate --, therefor.

In Column 10, Line 30, in Claim 29, delete "configured generate" and insert -- configured to generate --, therefor.